May 17, 1927.
F. HUNGATE
1,629,340
OIL CIRCULATING SYSTEM
Filed July 23, 1925
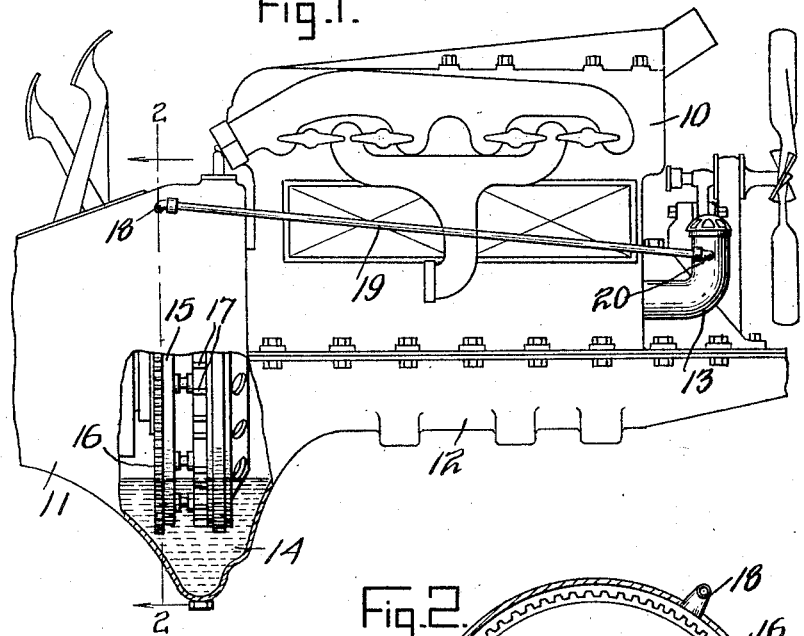
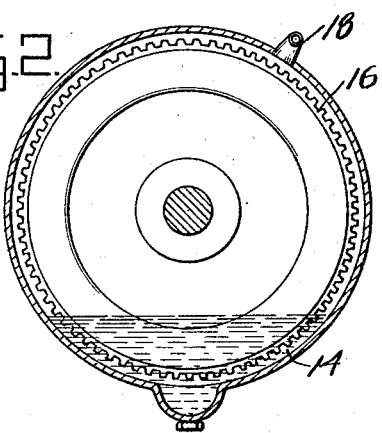
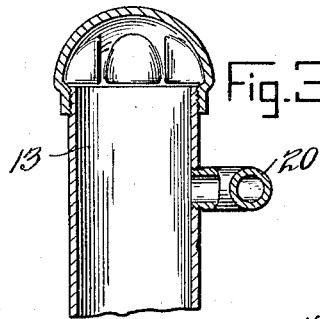
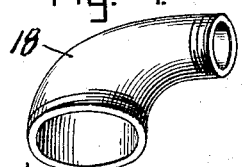
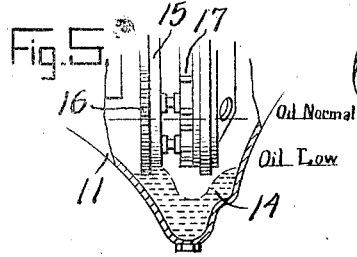
Inventor
Fred Hungate
By
Attorney Patented May 17, 1927.

1,629,340

UNITED STATES PATENT OFFICE.

FRED HUNGATE, OF TAMPA, FLORIDA, ASSIGNOR OF ONE-HALF TO LEMUEL G. GILLASPY, OF INDIANAPOLIS, INDIANA.

OIL-CIRCULATING SYSTEM.

Application filed July 23, 1925. Serial No. 45,659.

My said invention relates to lubricating systems for automobiles of the Ford or other type having a fly wheel and magnets associated therewith enclosed in a casing containing a well or sump of liquid lubricant in which the said fly wheel is partially submerged and from which sump said lubricant is thrown by centrifugal force during the rotation of said fly wheel.

The object of the invention is to provide simple and inexpensive means for forcing the oil to the front of the motor at all times during the operation of the same insuring a more efficient operation and preventing damage to the bearings at the front end and at a distance from the well of oil.

It is also an object of the invention to provide a device of this character which will continue to function when the oil has gotten low or below the normal oil level in the well in the casing for the fly wheel or transmission case.

Referring to the accompanying drawings which are made a part hereof and on which similar reference characters indicate similar parts, Figure 1 is a side elevation of an automobile of the type referred to having a portion of the crank case broken away and illustrating the application of my invention, Figure 2, a section on the line 2—2 of Fig. 1, Figure 3, an enlarged detail of the breather pipe connection, Figure 4, a perspective of a coupling member, and Figure 5, a fragmentary detail illustrating the effect upon oil in the bottom of the crank case or sump when at a low level.

In the drawings I have shown an engine 10 having a transmission case 11, a crank case 12 and a breather pipe 13. A quantity of oil is contained in an oil sump 14 and in which is disposed a fly wheel 15, having a ring gear 16 attached to one face thereof and having V-shaped magnets 17 supported in spaced relation from the opposite face thereof in the usual manner and, when rotating, constituting a series of fan blades or impellers for the oil (see Fig. 5). If the oil is at the normal proper level the lowermost magnets are practically submerged when the engine is idle and when the engine is running the magnets and associated parts dip into the oil and discharge it radially in all directions by centrifugal force. Oil is thrown into the crank case where it lubricates the bearings and gravitates back into the sump 14.

In the present invention in order to carry out the objects of the same, I provide an opening in the upper portion of the transmission case 11 and thread into such opening the larger end of a reducing coupling or nipple 18 having a smooth gradually tapering interior to insure a smooth unobstructed flow of lubricant therethrough. To the smaller end of the coupling 18 is connected one end of a pipe 19 disposed in an inclined position with its lower opposite end provided with an elbow 20 curving gradually between its extremities and of an unobstructed internal construction. The elbow 20 is tapped into the side of the breather pipe 13 in a horizontal plane below the plane of the entrance end and terminates substantially flush with the internal surface of the same.

By the above construction oil gaining admission through the coupling 18 into the pipe 19 will flow by gravity through the breather pipe 13 into the front end of crank case 12 and finally back into the sump 14 in the transmission case 11. In this manner the engine is more thoroughly and effectively lubricated during the continuous entry of the oil into the coupling 18. However, when the oil level is low or below normal (see Fig. 5) if the entrance end of the coupling is disposed over the periphery of the revolving magnets 17 they have the faulty feature of not delivering oil. By experimenting I find that when the inlet end of the coupling is over the magnets they act as a series of fans or fan blades which according to the speed of the motor and depth of the oil form a concavity in the oil in the sump with the result that very little or no oil is centrifugally discharged from the magnet ends but the low oil level is raised at the junction between the fly wheel 15 and the ring gear 16. Also on account of the periphery of the ring gear being beyond the periphery of the fly wheel there is a blocking action of the oil fanned by the magnets, the ring gear teeth also assisting in blocking the oil by their fanning action as shown in Fig. 5.

In view of the foregoing I provide the enlarged entrance end of the coupling 18 in the transmission casing in line with the junction between the fly wheel and ring gear as this makes an ideal location for the same and as the device functions in a smoother and much more certain manner.

By inserting the outlet end of the pipe in the side of the breather pipe and substantially flush with the same I provide a cooling action on the oil and since the oil is not delivered into the center of the breather any exhaust gases escaping therethrough may pass out without splattering or expelling the oil through the breather cap. Also the oil is cooled during its passage through the pipe 19 which keeps the oil nearer its normal body as shown by temperature readings under like conditions with and without tubes.

If desired the pipe 19 may be tortuous to subject the oil to a greater cooling action.

Another very desirable feature of my invention is its unlikeliness to become clogged, which is almost impossible on account of the inverted position of the entrance end of the coupling 18, any foreign matter being removed by the action of gravity or washed off by the splash of oil.

It will be obvious to those skilled in the art that various changes may be made in my device without departing from the spirit of the invention and therefore I do not limit myself to what is shown in the drawings and described in the specification but only as indicated in the appended claims.

Having thus fully described my said invention, what I claim as new and desire to secure by Letters Patent is:

1. The combination in an internal combustion engine having a crank case with its forward and rear portions sloping gently downwardly to form an oil sump and having a fly wheel disposed between said sloping portions and a ring gear of slightly larger size than said fly wheel connected thereto, of an oil receiving nipple disposed in the fly wheel housing in the plane of the junction between the rear side of the fly wheel and the forward side of the ring gear and a pipe having one end connected to said nipple said pipe sloping slightly forward and downwardly and terminating in the breather pipe, whereby when the oil in the crank case is fanned by the magnets on the fly wheel said ring gear will obstruct or dam the oil and cause the same to be discharged through said pipe into the breather pipe, substantially as set forth.

2. The combination in an internal combustion engine, of an oil receiving nipple disposed in the upper part of the fly wheel housing in inverted position in line with the junction between the fly wheel and ring gear said nipple having a large unobstructed inlet end terminating substantially flush with the inner surface of said housing in the path of the centrifugally thrown oil and tapering gradually to its reduced outlet end, and a pipe having one end connected to said reduced outlet end of the nipple and having its opposite end terminating in the side of the breather pipe, substantially as set forth.

In witness whereof, I have hereunto set my hand at Tampa, Florida this 2nd day of July, A. D. nineteen hundred and twenty-five.

FRED HUNGATE.